United States Patent
Achten et al.

(10) Patent No.: US 12,018,163 B2
(45) Date of Patent: Jun. 25, 2024

(54) METHOD FOR COATING A SUBSTRATE WITH A DROP-ON-DEMAND PRINTER

(71) Applicant: Covestro Intellectual Property GmbH & Co. KG, Leverkusen (DE)

(72) Inventors: Dirk Achten, Leverkusen (DE); Joerg Tillack, Solingen (DE); Fabian Schuster, Leverkusen (DE); Ann-Christin Bijlard-Jung, Bergisch Gladbach (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 103 days.

(21) Appl. No.: 17/773,933

(22) PCT Filed: Nov. 10, 2020

(86) PCT No.: PCT/EP2020/081556
§ 371 (c)(1),
(2) Date: May 3, 2022

(87) PCT Pub. No.: WO2021/094273
PCT Pub. Date: May 20, 2021

(65) Prior Publication Data
US 2022/0389255 A1 Dec. 8, 2022

(30) Foreign Application Priority Data
Nov. 14, 2019 (EP) .................................... 19209062

(51) Int. Cl.
*C09D 11/36* (2014.01)
*B05B 1/30* (2006.01)
*B05B 12/04* (2006.01)
*B41J 2/14* (2006.01)
*C09D 11/101* (2014.01)
(Continued)

(52) U.S. Cl.
CPC ............... *C09D 11/36* (2013.01); *B05B 1/30* (2013.01); *B05B 12/04* (2013.01); *B41J 2/14* (2013.01); *C09D 11/101* (2013.01); *C09D 11/107* (2013.01); *B05D 1/02* (2013.01); *B05D 2503/00* (2013.01)

(58) Field of Classification Search
CPC ...... C09D 11/36; C09D 11/101; C09D 11/107; B05B 1/30; B05B 12/04; B41J 2/14; B05D 1/02; B05D 2503/00
See application file for complete search history.

(56) References Cited

U.S. PATENT DOCUMENTS 7,927,669 B2 * 4/2011 Schlatterbeck .......... B05D 1/36
427/595
9,994,020 B2 6/2018 De et al.
(Continued)

FOREIGN PATENT DOCUMENTS

| WO | 2019030267 A1 | 2/2019 | |
| WO | 2019109040 A1 | 6/2019 | |
| WO | WO-2019109040 A1 * | 6/2019 | ............... B05B 1/02 |

OTHER PUBLICATIONS

International Search Report, PCT/EP2020/081556, date of mailing: Feb. 2, 2021, Authorized officer: N. Deligiannidis.

*Primary Examiner* — Yaovi M Ameh
(74) *Attorney, Agent, or Firm* — The Webb Law Firm (57) ABSTRACT

The invention relates to a 2K coating formulation that is printed without a mask using a valve jet printer.

9 Claims, 4 Drawing Sheets

(51) Int. Cl.
*C09D 11/107* (2014.01)
*B05D 1/02* (2006.01)

(56) References Cited

U.S. PATENT DOCUMENTS

| | | | |
|---|---|---|---|
| 10,604,453 B1* | 3/2020 | Peng | C04B 41/009 |
| 2015/0141548 A1* | 5/2015 | Drumright | C08L 63/00 |
| | | | 523/400 |
| 2017/0361346 A1 | 12/2017 | Lahidjanian et al. | |

* cited by examiner

METHOD FOR COATING A SUBSTRATE WITH A DROP-ON-DEMAND PRINTER

CROSS-REFERENCE TO RELATED APPLICATION

This application is a national stage application under 35 U.S.C. § 371 of PCT/EP2020/081556, filed Nov. 10, 2020, which claims the benefit of European Application No. 19209062.9, filed Nov. 14, 2019, each of which is incorporated herein by reference.

The present invention relates to a process for coating a substrate comprising the step of dropletwise application of a coating composition from a printing head onto a substrate, wherein the printing head has a closable opening which allows or prevents discharge of a droplet of the coating composition under instructions from a control unit.

BACKGROUND

An industrial paint typically has the feature of combining the functions of protection and decoration. Industry-standard paints in fields of application such as transport, furniture and the flooring industry may comprise paint film thicknesses of 0.01 to 0.2 mm, wherein a plurality of functional strata are often combined. These layers are typically: Primer as an adhesion promoter to the substrate, basecoat as the color-giving layer and topcoat or clearcoat as the primary protective layer.

There is a need for printing technologies for efficient application of industry-standard paint formulations in the transport, furniture and flooring industries onto industrial substrates customary in said industries.

EP 3 257 590 A1 discloses an apparatus for maskless painting of an aircraft surface comprising a multiaxis robot having at least one applicator for the paint, wherein the applicator is adapted to apply the paint using a technology for discharging the paint. The paint may be for example an external primer, a basecoat, a topcoat, a decorative coat, a clearcoat, a functional coat or a protective coat. The technology may be an inkjet technology.

WO 2019/030267 A1 discloses a process for producing a 3-dimensional object comprising at least a first and a second object section, wherein the first object section is produced by a 3D printing process directly on the second object section not produced by a 3D printing process and wherein the first object section produced by a 3D printing process contains or consists of a polyurethane resin.

WO 2016/046134 A1 discloses a high viscosity valvejet process in which a liquid is discharged through an opening in a valvejet printing head. The opening is defined with reference to certain geometrical parameters and the discharge viscosity of the liquid is between 20 mPa s and 3000 mPa s.

WO 2019/109040 A1 describes a system for applying a coating composition to a substrate using an applicator having a high application efficiency. The process comprises an applicator having a high application efficiency which defines a nozzle. The coating composition comprises a carrier and a binder. The coating composition has a viscosity of about 0.002 Pa*s to about 0.2 Pa*s, a density of about 838 kg/m$^3$ about 1557 kg/m$^3$, a surface tension of about 0.015 N/m to about 0.05 N/m and a relaxation time of about 0.0005 s to about 0.02 s. The applicator having a high application efficiency is configured such that it discharges the coating composition through the nozzle opening onto the substrate to form a paint layer. At least 80% of the droplets of the coating composition discharged from the applicator having a high application efficiency come into contact with the substrate.

U.S. Pat. No. 7,927,669 B2 discloses a process for applying coatings, in particular paints, to surfaces with an apparatus comprising a metering head comprising at least one nozzle controllable by a control signal. The process comprises the steps of: —moving a substrate with a surface to be coated along this surface relative to the metering head and/or moving the metering head relative to a surface to be coated of a substrate and—applying a fluid coating material to the surface through the nozzle in response to at least one control signal generated by a processor.

SUMMARY

The present invention has for its object to provide a digital printing process with which coating compositions—rather than inks—may be processed and by which well-defined paint edges may be achieved without masking of the substrate.

This object is achieved by a process as claimed in claim 1. Advantageous developments are specified in the subsidiary claims. They may be combined as desired unless the opposite is clear from the context.

DETAILED DESCRIPTION

In a process for coating a substrate comprising the step of dropletwise application of a coating composition from a nozzle onto a substrate the nozzle has a closable opening which allows or prevents discharge of a droplet of the coating composition under instructions from a control unit.

It is provided that the coating composition is applied more than once on less than 30% of the surface area of the substrate, that when the opening of the nozzle is closed a pressure of ≥1.2 bar to ≤3.5 bar acts upon the coating composition and that the opening of the nozzle has a diameter of ≥80 μm to ≤250 μm.

It is further provided that the coating composition comprises a reactive resin, a hardener for the resin and a solvent, in which coating composition resin and hardener are altogether present in a proportion of ≥20% by weight based on the total weight of the coating composition and that the coating composition has a viscosity at 20° C. measured according to EN ISO 3219/A3 at a shear rate of 1000/s of ≥20 mPa s to ≤80 mPa s.

The process according to the invention makes it possible to apply individual droplets of a solvent-based two-component paint formulation (2K paint formulation) to a substrate, wherein the droplets combine to form an uninterrupted layer on the substrate. Evaporation of the solvent then affords an uninterrupted coating on the substrate. It has surprisingly been found that coatings meeting the quality requirements are obtainable efficiently and economically within the parameters provided according to the invention. Standard formulations for the paints may even be used. Application may be followed by hardening of the coating by customary processes.

The coating process comprises the closable opening of the nozzle as a variant of the so-called drop-on-demand printing process, especially as a coating process performed using valvejet printers. The opening of the nozzle may be opened or closed for example using a magnetically operated plunger. The frequency with which the opening of the nozzle is opened and closed again may preferably be in the range from 800 Hz to 4000 Hz.

It will be appreciated that a plurality of such nozzles may be used. They may be arranged together on a movable printing head. The control unit is typically arranged in the apparatus used for the process such as a valvejet printer and may for example comprise a raster image processor (RIP).

The process according to the invention is suitable to be performed as a so-called single-pass process. This is to be understood as meaning that the smallest possible surface area of the substrate is provided with the coating composition more than once. According to the invention it is provided that the coating composition is applied more than once to less than 30% of the surface area of the substrate. It is preferable when less than 20% of the surface area to be printed and particularly preferably less than 10% of the surface area to be printed is concerned. Ideally each surface area section of the substrate to be printed is printed with the coating composition only once with the exception of technically unavoidable overlaps and imprecisions.

Compared to spraying processes for application of paints the process according to the invention differs inter alia in that larger droplets are discharged. The droplets are precisely placed as a consequence of the process. Furthermore, markedly less solvent evaporates in the short flight path of the droplet between the nozzle and the substrate. The solvent which still remains in the formulation can therefore ensure a reduction in the viscosity of the formulation on the substrate such that a continuous film can be formed from the individual droplets.

In terms of machine parameters the inventors have found that when the opening of the nozzle is closed a pressure of ≥1.2 bar to ≤3.5 bar should act upon the coating composition. This may be considered the "operating pressure" of a valvejet printer and is more easily determinable than a pressure when the nozzle is open during discharge of material. Preferred pressures are ≥1.2 bar to ≤3 bar and particularly preferably ≥1.4 bar to ≤2.5 bar.

The inventors have further found that the opening of the nozzle should have a diameter of ≥80 µm to ≤250 µm. Preferred diameters are ≥100 µm to ≤200 µm, particularly preferably ≥120 µm to ≤150 µm.

The type of substrate is not subject to any particular limitations. The substrate may be planar or curved. The process according to the invention may also process relatively large substrates, for example with areas of more than 1 m², more than 10 m² or more than 100 m². Suitable materials may include aluminum, steel or polymers. The substrate may be part of a finished assembly such as a machine housing or may be in the form of a semifinished product such as a tape, roll or sheet material.

The coating composition comprises a reactive resin, a hardener for the resin and a solvent and may therefore be considered a 2K composition. These compositions are only prepared before application since on account of the reaction of the resin with the hardener only a limited processing time exists. Typical reactions of the resin with the hardener are crosslinking reactions to form covalent bonds. It will be appreciated that the composition may also contain further components such as reactive diluents or additives. Solids-containing coating compositions may thus also be processed. The d90 value of the particle size distribution for these particles is preferably ≤5 µm. The coating composition may be conceived as a basecoat, color coat or topcoat.

The proportion of resin and hardener of altogether ≥20% by weight further distinguishes the composition from binder-containing inkjet inks. In such inks the proportion of the binder is markedly lower. Based on the total weight of the coating composition the total proportion of resin and hardener is preferably ≥30% by weight and more preferably ≥40% by weight.

The viscosity provided for according to the invention likewise distinguishes the composition from binder-containing inkjet inks; it is markedly lower in the latter. Preferred viscosities are ≥25 mPa s to ≤70 mPa s and particularly preferably ≥30 mPa s to ≤65 mPa s.

In the process according to the invention it is further provided that the substrate comprises no temporarily applied mask onto which the coating composition is applied. The process is a maskless process. The inventors have found that the process requires no masking on the substrate since the edge sharpness of the printed image achieved with the coating composition is already satisfactory. This can result in great time and cost savings if for example colored stripes or scripts are to be applied to a substrate already painted in a background color.

The process may be performed such that the desired wet paint film thickness based on the employed paint quantity is produced with a material yield of >90%, preferably >95% and very particularly preferably 98% since there is no overspray and no significant evaporation of solvent or components on the way to the substrate.

The process may further be performed such that the desired dry paint film thickness is 1.5 times, preferably 1.7 times and very particularly 2 times less than the wet paint film thickness.

The process may further be performed such that a solvent-based paint to be applied loses less than 20%, preferably less than 10% and very particularly less than 5% of its solvent on the way to the substrate, thus allowing the necessary solvent evaporation process to take place in a controlled manner on the substrate, thus obtaining reduced environmental impacts and improved surface qualities compared to conventional spray application processes.

A coating layer obtained by the process according to the invention may after a single run (single-pass printing) have a dry paint film thickness (dry film thickness, DFT) in the range from 0.015-0.080 mm, preferably 0.02 to 0.06 mm and very particularly preferably 0.025 to 0.05 mm.

In one embodiment the following parameters are chosen such that according to the following formula the calculated index K ≥ is 0.4 to ≤4

$$K = \frac{\left(\frac{R}{50}\right)^2 \left(\frac{p}{2}\right)^{2.5} \left(\frac{d}{120}\right)^2 \left(\frac{S}{45}\right) \left(\frac{45}{C}\right)^2}{\left(\frac{\eta}{50}\right)^3}$$

where:
R: spatial resolution of application of coating composition in dots per 2.54 cm
p: pressure acting on coating composition when opening of nozzle is closed in bar
d: diameter of closable opening of nozzle in µm
S: proportion of nonvolatile constituents of coating composition in % by weight based on total weight of coating composition according to ISO 3251, 120 min, 100° C.

η: viscosity at 20° C. measured according to EN ISO 3219/A3 at a shear rate of 1000/s in mPa s C: dynamic contact angle determined as advancing angle according to DIN EN ISO 19403-6 of coating composition on substrate in degrees.

This empirically determined formula results from statistical analyses of the test results carried out by the inventors and allows optimized adjustment of the remaining parameters when some of the parameters are known. Thus for example in case of known machine parameters (resolution in dpi, pressure, nozzle diameter) and a solids content specified by the formulation of the paint the viscosity or the contact angle may be brought into the target range through addition of solvents. To calculate the index K physical units are ignored. Only the numerical values of the parameters involved are required.

In a further embodiment the dropletwise application of the coating composition onto the substrate is carried out through a plurality of nozzles and each of the nozzles has a closable opening which independently of other closable openings of other nozzles allows or prevents discharge of a droplet of the coating composition under instructions from the control unit.

In a further embodiment the spatial resolution of the discharge of the coating composition is ≥30 dots per 2.54 cm to ≤150 dots per 2.54 cm. This is the resolution reported as is customary in the printing sector in dots per inch (dpi). Preferred resolutions are ≥40 dots per 2.54 cm to ≤130 dots and particularly preferably ≥50 dots per 2.54 cm to ≤120 dots per 2.54 cm.

In a further embodiment in the coating composition the solvent is selected from: water, n-hexane, isohexane, cyclohexane, n-heptane, isoheptane, n-octane, isooctane, mineral spirits, xylene, solvent naphtha, propanol, n-butanol, isobutanol, butyl glycol, butyl diglycol, ethylene glycol, diethyl glycol, butyl acetate, ethyl acetate, 2-butoxyethyl acetate, 1-methoxy-2-propyl acetate, butanone, acetone, 2-heptanone, 2,4-pentanedione, 2-pentanone, ethyl-3-ethoxypropionate, 1,2,4-trimethylbenzene, 4-methylpentan-2-one or a mixture of at least two of the abovementioned solvents.

In a further embodiment preceding claims the coating composition has a pot life of ≥30 minutes to ≤480 minutes, wherein the pot life is defined as the time until doubling of the viscosity measured at 23° C. according to DIN EN ISO 3219/A. The pot life is preferably ≥60 minutes to ≤240 minutes.

In a further embodiment the resin is an epoxy resin and the hardener is a polymerization catalyst, a primary amine, a cyclic anhydride, a polyphenol, a thiol or a mixture of at least two of the abovementioned compounds.

Epoxy resins and epoxy hardeners as the reactive mixture form the epoxy resin binder which hardens via polyaddition reactions. Hardening causes usually low viscosity or low molecular weight monomeric and oligomeric components of the binder to form high molecular weight, three-dimensional networks through the crosslinking reaction. The network nodes are formed by the reaction of the functional groups of the resins and the hardeners. Suitable epoxy resins especially include those based on glycidyl ethers, glycidyl esters, glycidylamines, cycloaliphatic epoxides and glycidyl isocyanurates.

Examples of hardeners are 1,3-diaminobenzene, diethylenetriamine, 4,4'-methylenebis(cyclohexylamine) and hexahydrophthalic anhydride.

In a further embodiment the resin is a polyol, a polyamine, an amino alcohol or a mixture of at least two of the abovementioned compounds and the hardener is a blocked or unblocked polyisocyanate.

Suitable polyols are the polyether polyols, polyester polyols, polycarbonate polyols, polyester amide polyols, polyamide polyols and epoxy resin polyols known from polyurethane chemistry and their reaction products with $CO_2$ and polyacrylate polyols.

Examples of polyamines are 3-amino-1-methylaminopropane, 3-amino-1-ethylaminopropane, 3-amino-1-cyclohexylaminopropane or 3-amino-1-methylaminobutane. Examples of amino alcohols are N-aminoethylethanolamine, ethanolamine, 3-aminopropanol, neopentanolamine or diethanolamine Examples of polyisocyanates are polyisocyanates or polyisocyanate mixtures having exclusively aliphatically and/or cycloaliphatically bonded isocyanate groups having an (average) NCO functionality between 2.0 and 5.0 and a viscosity at 23° C. of 10 to 2000 mPas. Suitable polyisocyanates are in particular those based on isophorone diisocyanate, hexamethylene diisocyanate, bis(4-isocyanatocyclohexyl)methane and ω,ω'-diisocyanato-1,3-dimethylcyclohexane (H6XDI).

The recited diisocyanates may optionally be used as such or derivatives of the diisocyanates are employed. Suitable derivatives include polyisocyanates containing biuret, isocyanurate, uretdione, urethane, iminooxadiazinedione, oxadiazinetrione, carbodiimide, acylurea or allophanate groups. Particular preference is given to low-monomer paint polyisocyanates having these structural elements selected from isophorone diisocyanate (IPDI), hexamethylene diisocyanate (HDI), 1,4-diisocyanatocyclohexane or bis(4-isocyanatocyclohexyl)methane.

The polyisocyanate component may optionally be hydrophilically modified. Water-soluble/-dispersible polyisocyanates are obtainable for example by modification with carboxylate, sulfonate and/or polyethylene oxide groups and/or polyethylene oxide/polypropylene oxide groups.

Suitable blocking agents for the polyisocyanates are for example monohydric alcohols such as oximes such as acetoxime, methylethylketoxime, cyclohexanoneoxime, lactams such as ε-caprolactam, phenols, amines such as diisopropylamine or dibutyl amine, dimethylpyrazole or triazole and dimethyl malonate, diethyl malonate or dibutyl malonate.

Particular preference is given to a coating composition comprising the isocyanurate of 1,6-HDI ("HDI-Trimer") and a polyacrylate polyol. Viscosity adjustment may be carried out using butyl acetate (BA), 1-methoxy-2-propyl acetate (MPA), solvent naphtha and mixtures thereof. To influence surface activity a silicone additive may be added.

In a further embodiment in the coating composition the NCO index is ≥0.8 to ≤1.5, preferably ≥0.9 to ≤1.3 and particularly preferably ≥1 to ≤1.2.

In a further embodiment the coating composition is adapted to the substrate such that a dynamic contact angle determined as the advancing angle according to DIN EN ISO 19403-6 of the coating composition on the substrate is ≥30° to ≤90°. This may be achieved by varying the solvent contents or by suitable additives. Angles outside these values can result in islandization of the droplets on the substrate or a reduction in the precision of edge depiction in the printed image.

EXAMPLES

The present invention is more particularly elucidated by the figures and examples which follow without, however, being limited thereto.

Methods
Visual Assessment:

Edge quality between coated and uncoated substrate was visually assessed on a scale of 1 to 5, wherein 1 is best. The references in the figure have the following meanings: 1: sharp edge, 2: sharp edge with slight fluctuations, 3: sharp edge with intermediate fluctuations, 4: irregular edge and 5: double edge.

Viscosity:

Determination of viscosity is carried out according to DIN EN ISO 3219/A3 and was performed with an Anton Paar MCR301 rheometer. Anton Paar measuring beaker: Cylinder geometry, measuring beaker diameter 28.92 mm, cylinder diameter 26.66 mm, annular gap length 40 mm, measurement temperature 20° C., shear rate of 1 to 1500 l/s in 55×5 s=275 s and of 1500 l/s to 1 in 275 s.

Materials
Component A:

Acrylate-containing polyol Setalux® D A 665 (BA/X) from Allnex Resins Germany GmbH/Allnex Netherlands BV.

BYK®331 (10% in methoxypropyl acetate) from BYK-Chemie is a silicone-containing surface additive for solvent-containing, solvent-free and aqueous paints and printing inks Component B:

Polyisocyanate: Employed was an HDI trimer DESMODUR ULTRA N 3390 BA/SN (NCO functionality >3) having an NCO content of 19.6% by weight (according to ISO 11909) and a nonvolatile content of 90% (according to ISO 3251, 120 min, 100° C.) from Covestro AG. The viscosity is about 550 mPa·s at 23° C. (DIN EN ISO 3219/A3).

The solvent used was butyl acetate (BA).

The substrates were aluminum sheets. These were first cleaned with ethyl acetate.

The raw materials were used without further purification or pretreatment unless otherwise stated.

Formulation

To produce component A the acrylate-containing polyol was diluted with BA and the surface additive homogeneously mixed. The hardener component was employed with the polyisocyanate in the ratio NCO:OH=1.0. The solids content of the mixture was about 50% by weight and was optionally further diluted. At a solids content of 50% the application viscosity at 23° C. (ISO cup 5 mm DIN EN ISO 2431) was about 30 s.

| Formulation | 1 [g] |
|---|---|
| Component A | |
| SETALUX D A 665 BA/X | 49.06 |
| BYK 331 | 0.50 |
| BUTYL ACETATE | 43.70 |
| Component B | |
| DESMODUR ULTRA N 3390 BA/SN | 18.40 |
| Sum | 111.66 |

Digital Printing Parameters

The digital printing experiments were performed with a ChromoJET CHR-TT 118 tabletop printer from Zimmer Austria. The premixed paint formulations were filled into 300 mL printing tanks 10 min after mixing. A pressure controller was used to establish an operating pressure of 2 bar. The system was initially washed through several times with the formulation and subsequently printing was carried out on the cleaned substrates. The printing surface area was 130*70 mm. The carriage speed was 0.6 m/s. A printing head having 8 nozzle groups with a nozzle diameter of 100 µm was used. After printing was complete the system was washed through with ethyl acetate.

The printing conditions are summarized in the table below.

| Parameter | Value |
|---|---|
| Formulation | 1 |
| Viscosity [mPas] at 1000/s at 23° C. | 33 |
| Solids [%] | 44 |
| Nozzle diameter [µm] | 100 |
| Pressure [bar] | 2.0 |
| Resolution x/y [dpi] | 50 |
| Dry film thickness [µm] | 36 |
| Contact angle [°] | 36 |
| Visual assessment | 1 |
| Index K | 3.1 |

The "index K" shown in the table was calculated according to the previously elucidated formula.

$$K = \frac{\left(\frac{R}{50}\right)^2 \left(\frac{p}{2}\right)^{2.5} \left(\frac{d}{120}\right)^2 \left(\frac{S}{45}\right) \left(\frac{45}{C}\right)^2}{\left(\frac{\eta}{50}\right)^3}$$

Figure 1A:
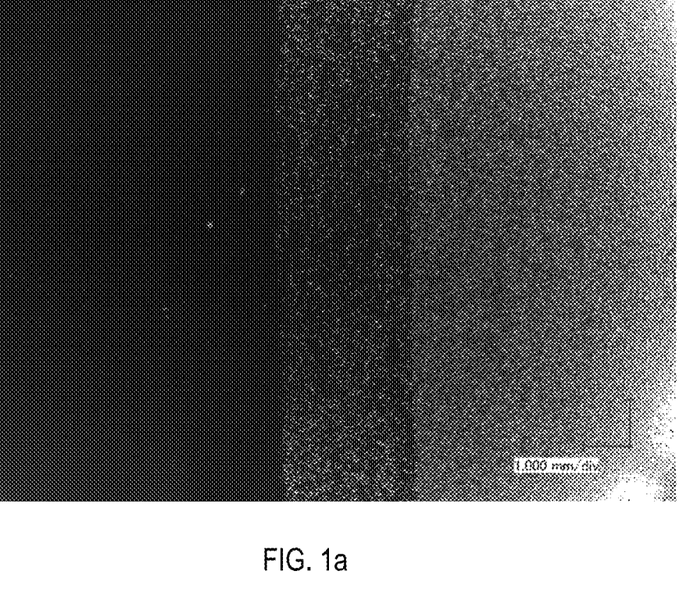
FIGS. 1a-1g are top views of micrographs of the boundary between a coating and a substrate for examples a-g, respectively.
Figure 1B:
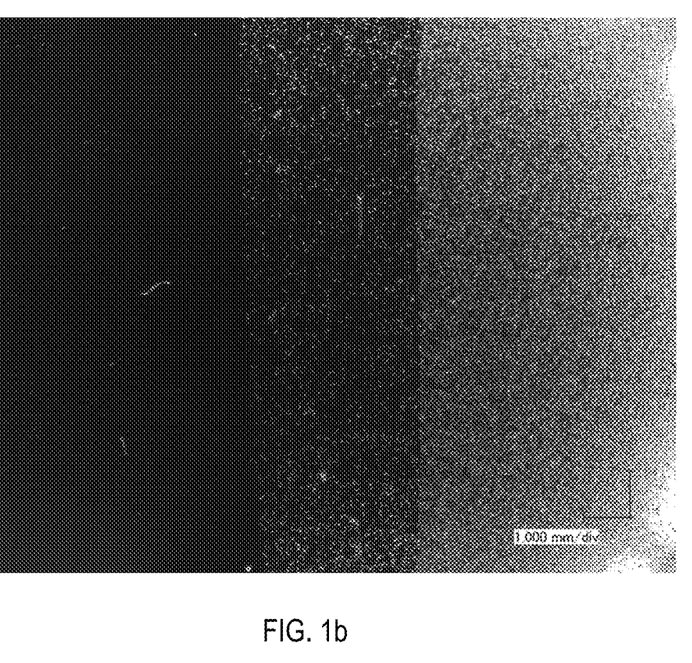
Figure 1C:
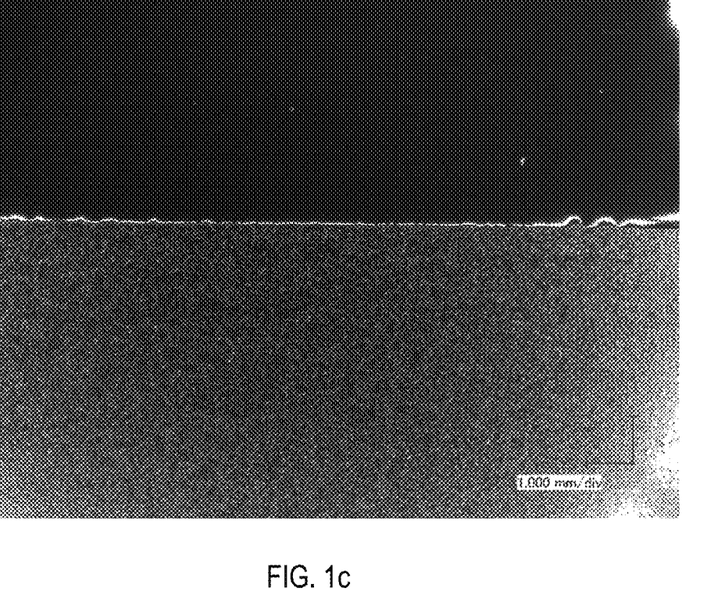
Figure 1D:
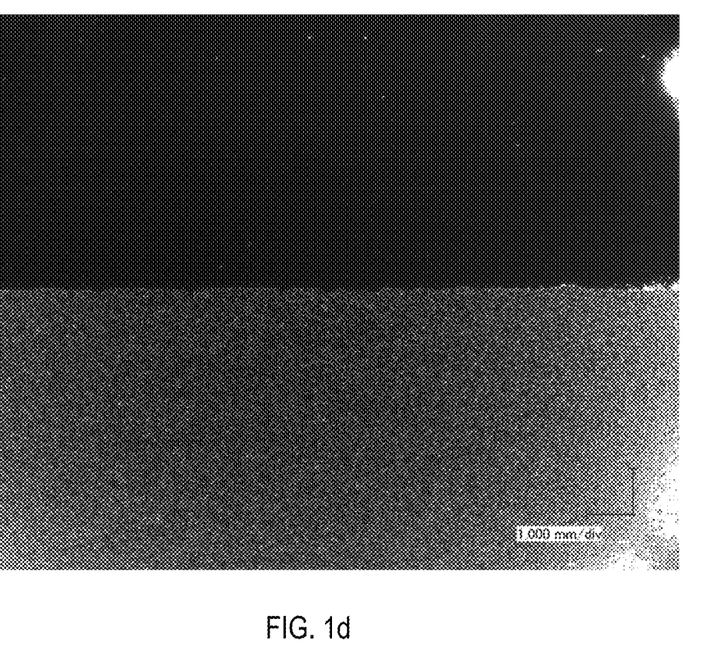
Figure 1E:
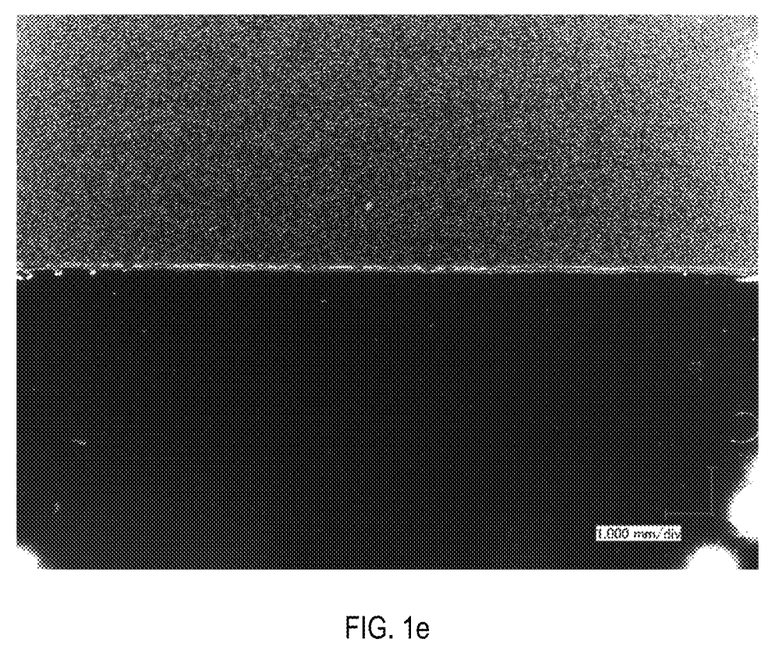
Figure 1F:
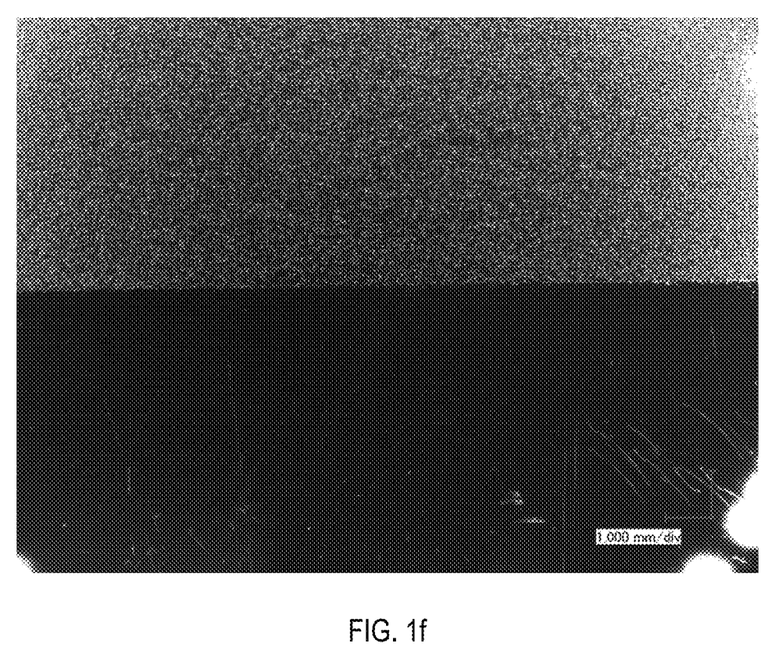
Figure 1G:
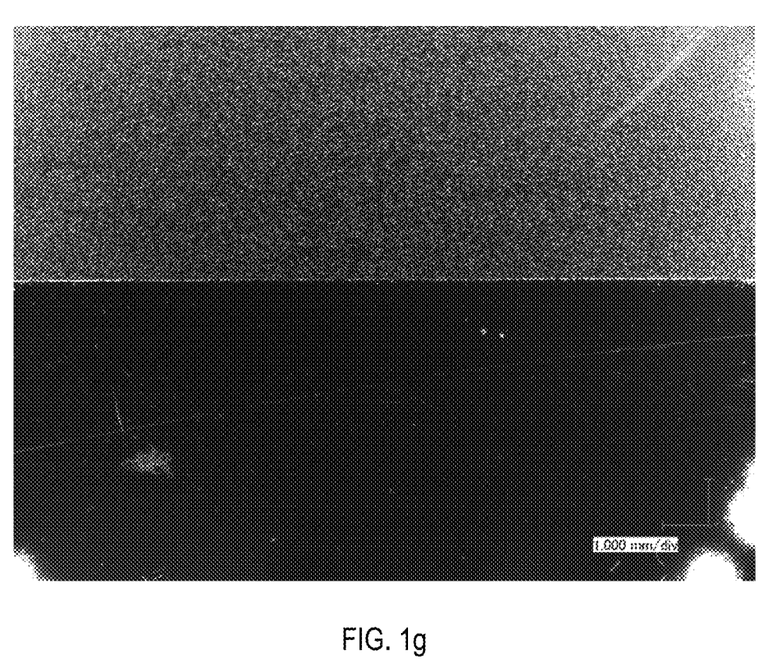

In the individual examples a to g the substrates having the above-described formulation 1 were coated using different coating methods. In the reported cases a subarea of the substrate was masked with adhesive tape. The hardening of all coatings was carried out at 140° C. for 30 minutes. The results of the visual edge assessment are documented in the table which follows. Corresponding micrographs of topviews of the boundary between the coating and the substrate (shown in the figures as the darker edge) are documented in FIG. 1a to FIG. 1g.

| | Doctor blade application | | Spray gun application | | | Digital printing (inventive) | |
|---|---|---|---|---|---|---|---|
| Flash-off time [min] | 10 | 2 | 10 | 2 | 2 | 2 | 10 |
| Masking | — | — | Yes | Yes | Yes | — | — |
| Removal of masking | — | — | After flash-off | After spray application | After hardening | — | — |
| FIG. 1 . . . | a | b | c | d | e | f | g |
| Assessment | 5 | 5 | 4 | 3 | 4 | 1 | 1 |

The invention claimed is:

1. A process for coating a substrate comprising:
   dropletwise application of a coating composition from a nozzle onto a substrate,
   wherein the nozzle has a closable opening which allows or prevents discharge of a droplet of the coating composition under instructions from a control unit,
   wherein the coating composition is applied more than once to less than 30% of the surface area of the substrate,
   wherein a pressure of ≥1.2 bar to ≤3.5 bar acts upon the coating composition when the opening of the nozzle is closed, wherein the opening of the nozzle has a diameter of ≥80 µm to ≤250 µm, wherein the coating composition comprises a resin, a hardener for the resin, and a solvent, wherein a reactive resin and a hardener are altogether present in the coating composition in a proportion of ≥20% by weight based on a total weight of the coating composition, wherein the coating composition has a viscosity at 20° C. measured according to DIN EN ISO 3219/A3 at a shear rate of 1000/s of ≥20 mPa·s to ≤80 mPa.·s, and wherein the substrate comprises no temporarily applied mask onto which the coating composition is applied, wherein the following parameters are chosen such that according to the following formula the calculated index K is ≥0.4 to ≤4;

$$K = \frac{\left(\frac{R}{50}\right)^2 \left(\frac{p}{2}\right)^{2.5} \left(\frac{d}{120}\right)^2 \left(\frac{S}{45}\right)\left(\frac{45}{C}\right)^2}{\left(\frac{\eta}{50}\right)^3}$$

where:
R: spatial resolution of application of coating composition in dots per 2.54 cm
p: pressure acting on coating composition when opening of nozzle is closed in bar
d: diameter of closable opening of nozzle in µm
S: proportion of nonvolatile constituents of coating composition in % by weight based on total weight of coating composition according to ISO 3251, 120 min, 100° C.
η: viscosity at 20° C. measured according to EN ISO 3219/A3 at a shear rate of 1000/s in mPa·s
C: dynamic contact angle determined as advancing angle according to DIN EN ISO 19403-6 of coating composition on substrate in degrees.

2. The process as claimed in claim 1, wherein the droplet­wise application of the coating composition onto the substrate is carried out through a plurality of nozzles, and wherein each of the nozzles has a closable opening which independently of other closable openings of other nozzles allows or prevents discharge of a droplet of the coating composition under instructions from the control unit.

3. The process as claimed in claim 1, wherein the spatial resolution of application of the coating composition is ≥30 dots per 2.54 cm to ≤150 dots per 2.54 cm.

4. The process as claimed in claim 1, wherein in the coating composition the solvent comprises water, n-hexane, isohexane, cyclohexane, n-heptane, isoheptane, n-octane, isooctane, mineral spirits, xylene, solvent naphtha, propanol, n-butanol, isobutanol, butyl glycol, butyl diglycol, ethylene glycol, diethyl glycol, butyl acetate, ethyl acetate, 2-butoxy­ethyl acetate, 1-methoxy-2-propyl acetate, butanone, acetone, 2-heptanone, 2,4-pentanedione, 2-pentanone, ethyl-3-ethoxypropionate, 1,2,4-trimethylbenzene, 4-methylpen­tan-2-one, or a mixture of at least two of the abovemen­tioned solvents.

5. The process as claimed in claim 1, wherein the coating composition has a pot life of ≥30 minutes to ≤480 minutes, wherein the pot life is defined as the time until doubling of the viscosity measured at 23° C. according to DIN EN ISO 3219/A.

6. The process as claimed in claim 1, wherein the resin is an epoxy resin and the hardener is a polymerization catalyst, a primary amine, a cyclic anhydride, a polyphenol, a thiol, or a mixture of at least two of the abovementioned compounds.

7. The process as claimed in claim 1, wherein the resin is a polyol, a polyamine, an amino alcohol, or a mixture of at least two of the abovementioned compounds and the hard­ener is a blocked or unblocked polyisocyanate.

8. The process as claimed in claim 7, wherein in the coating composition the NCO index is ≥0.8 to ≤1.5.

9. The process as claimed in claim 1, wherein the coating composition is adapted to the substrate such that a dynamic contact angle, determined as the advancing angle according to DIN EN ISO 19403-6, of the coating composition on the substrate is ≥30° to ≤90°.

* * * * *